United States Patent [19]
Huang

[11] Patent Number: 5,947,666
[45] Date of Patent: Sep. 7, 1999

[54] CARGO POSITIONING DEVICE WITH QUICK RETRACTION AND RELIABLE RETAINING FUNCTION

[76] Inventor: Han-Ching Huang, P.O. Box 63-247, Taichung, Taiwan

[21] Appl. No.: 09/174,853

[22] Filed: Oct. 19, 1998

[51] Int. Cl.[6] .................................................. B60P 7/15
[52] U.S. Cl. .......................................... 410/151; 410/143
[58] Field of Search ..................... 410/143, 145, 410/151; 211/105.3; 248/354.6, 354.7; 254/12, 95, 112; 74/167, 141.5

[56] References Cited

U.S. PATENT DOCUMENTS

| | | | |
|---|---|---|---|
| 4,781,499 | 11/1988 | Wisecarver | 410/151 |
| 5,094,576 | 3/1992 | Fredelius | 410/151 |
| 5,378,095 | 1/1995 | Shultz | 410/151 |
| 5,443,342 | 8/1995 | Huang | 410/151 |
| 5,472,301 | 12/1995 | Wallen | 410/151 |
| 5,769,580 | 6/1998 | Purvis | 410/151 |
| 5,833,414 | 11/1998 | Feldman et al. | 410/151 |
| 5,890,856 | 4/1999 | Huang | 410/151 |

Primary Examiner—Stephen T. Gordon
Attorney, Agent, or Firm—Charles E. Baxley, Esq.

[57] ABSTRACT

A cargo positioning device includes an outer tube having a base fixed to an end thereof, a rack-like inner tube having an end slidably received in the outer tube, a gear rotatably supported by the base and meshed with the rack-like inner tube, a handle having an end pivotally connected to the base, and a catch member releasably engaged with a ratchet wheel that is formed on a side of the gear. The handle can be retained in either a first retaining position to prevent from rotation of the gear or a second retaining position to allow rapid outstretching or retraction of the inner tube away from or into the outer tube. The handle is also operable to allow outstretching of the inner tube.

6 Claims, 6 Drawing Sheets

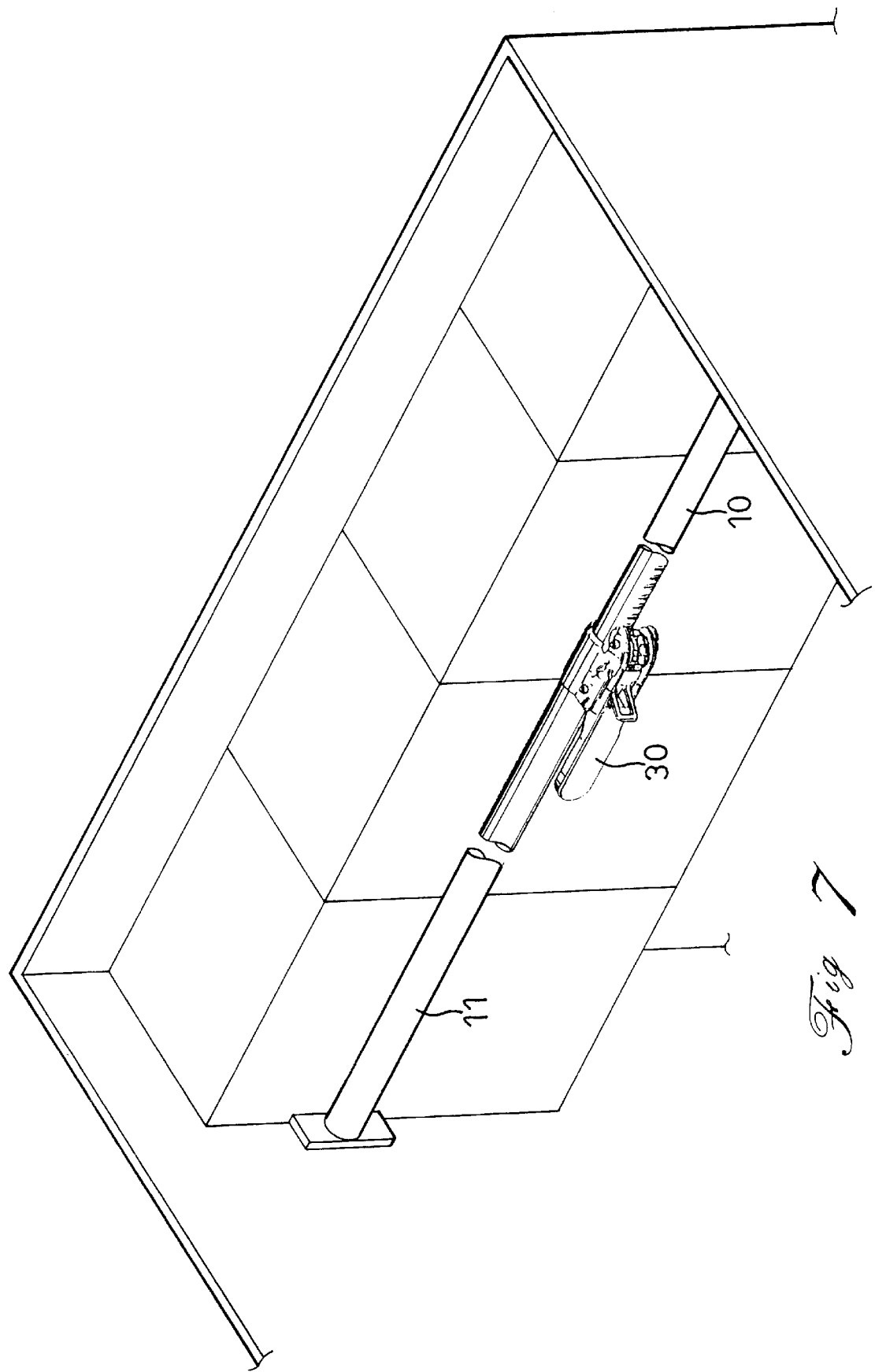

CARGO POSITIONING DEVICE WITH QUICK RETRACTION AND RELIABLE RETAINING FUNCTION

BACKGROUND OF THE INVENTION

1. Field of the Invention

The present invention relates to a cargo positioning device that allows quick retraction of a rack-like inner tube into an outer tube and may reliably retain the inner tube relative to the outer tube.

2. Description of the Related Art

U.S. Pat. No. 5,443,342 to Applicant issued on Aug. 22, 1995 discloses a device for positioning cargo that solves the problems of limited displacement of the rack and inconvenient operation of conventional cargo positioning devices. Nevertheless, in said U.S. Pat. No. 5,443,342, it is found that the rack cannot be quickly retracted into the tube, while the handle cannot be reliably retained in place, i.e., the rack is not reliably fixed relative to the tube. In addition, outstretching of the rack away from the tube is not rapid enough. The present invention is intended to provide an improved device to solve this problem.

SUMMARY OF THE INVENTION

It is a primary object of the present invention to provide an improved cargo positioning device that allows quick retraction or outstretching of a rack-like inner tube into or away from an outer tube.

It is another object of the present invention to provide an improved cargo positioning device in which the inner tube may be reliably fixed relative to the outer tube after the inner tube reaches the desired location.

A cargo positioning device in accordance with the present invention comprises:

- a tube with a base fixed to an end thereof, the base including a first engaging member and a second engaging member provided thereon,
- a rack means having an end slidably received in the tube and movable in an outstretching direction and a retracting direction,
- a gear means including a gear rotatably supported by the base and meshed with the rack means, the gear including a ratchet wheel formed on a side thereof to rotate therewith,
- a handle including a first end pivotally connected to the base and a second operative end, the handle being movable between a first retaining position and a second retaining position,
- a catch member including an end releasably engaged with the ratchet wheel of the gear means,
- means for biasing the catch member to engage with the ratchet wheel,
- a retaining member mounted to the handle,
- wherein when the handle is at the first retaining position, the retaining member engages with the first engaging member on the base and thus prevents from rotational movement of the handle such that the gear is not rotatable while the catch member engages with the ratchet wheel, and when the handle is at the second retaining position, the retaining member engages with the second engaging member on the base, and the first end of the handle causes the catch to disengage from the ratchet wheel to thereby allowing free rotation of the gear such that the rack means is movable both in the outstretching direction and the retracting direction, and when the handle is reciprocatingly pivoted in a mediate area between the first retaining position and the second retaining position, the retaining member is in a free position, while the catch member engages with the ratchet wheel such that the gear means is rotatable in a direction that allows the rack means to move in the outstretching direction.

The rack means may be an inner tube having a plurality of holes defined in a periphery thereof for engaging with the gear.

The base is C-shaped and includes two side walls formed on two opposite end edges thereof. The side walls have aligned slots defined therein, and the catch member includes two lateral edges slidably received in the slots, respectively. The basing means includes a bracket secured between the side walls of the base and a spring attached between the bracket and the catch member to bias the catch member to engage with the ratchet wheel.

The first end of the handle includes two parallel lateral walls having aligned slots defined therein, and the retaining member includes two lateral edges slidably received in the aligned slots, respectively. A spring is provided for biasing the retaining member away from the second operative end of the handle. The retaining member further includes a release member for manually pressing toward the spring for disengaging the first end of the retaining member from the first engaging member and the second engaging member of the base to thereby allow the handle to leave the first retaining position and the second retaining position.

Other objects, advantages, and novel features of the invention will become more apparent from the following detailed description when taken in conjunction with the accompanying drawings.

BRIEF DESCRIPTION OF THE DRAWINGS

FIG. 7 is a schematic perspective view illustrating use of the cargo positioning device.

DETAILED DESCRIPTION OF THE PREFERRED EMBODIMENT

Figure 1:
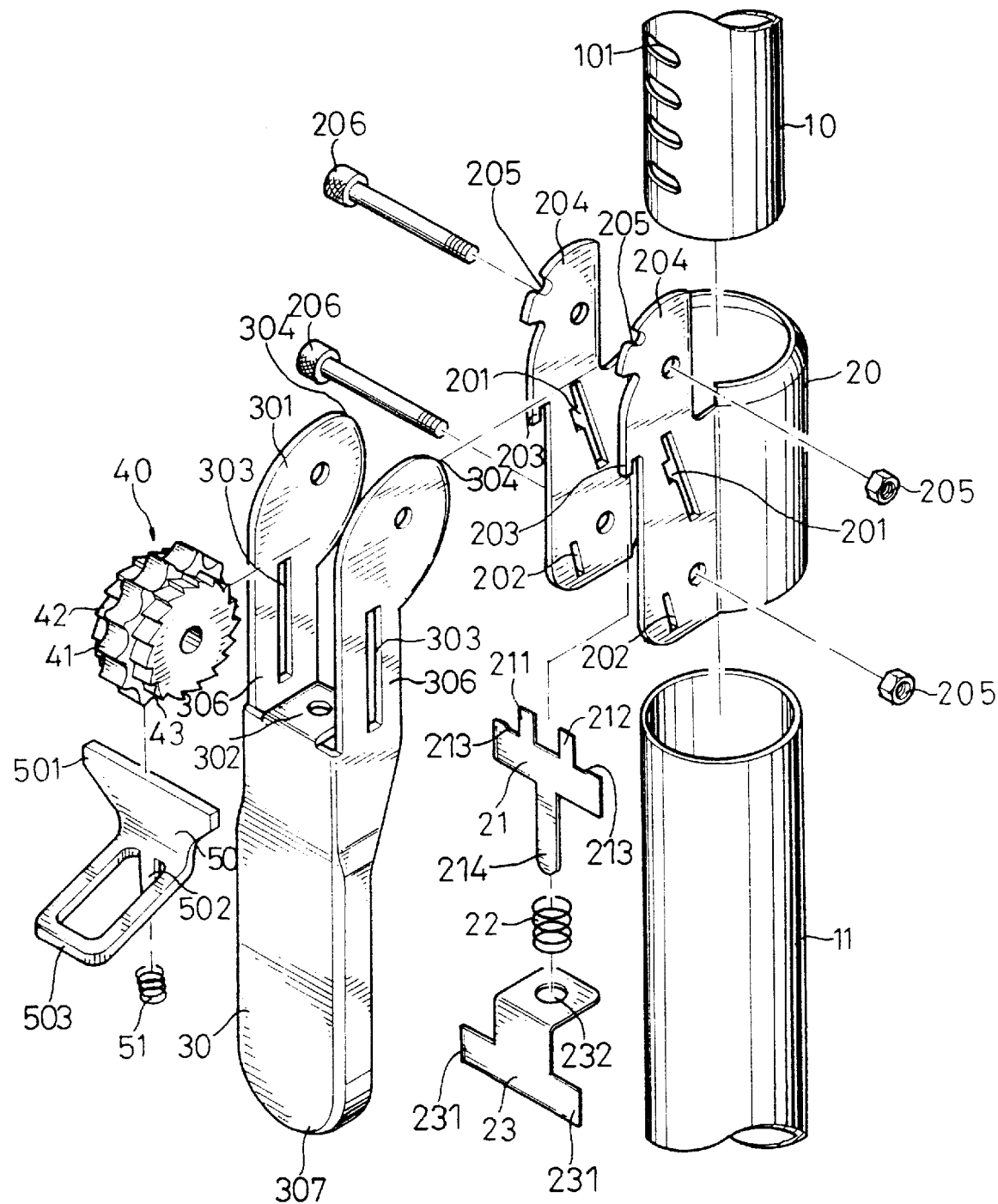
FIG. 1 is an exploded perspective view of a main portion of the cargo positioning device in accordance with the present invention.

Referring to the drawings and initially to FIG. 7, the present invention provides a cargo positioning device to retain cargo in place. The present invention includes an outer tube 11 having an end with a plate (not labeled) attached to an inner wall of a cargo container, an inner tube 10 having an end slidably received in the outer tube 11, and a handle 30 that is operable to make the other end (also with a plate) of the inner tube 10 attached to the opposite inner wall of the cargo container. The inner tube 11 and the outer tube 10 are fixed in place and thus apply a force to the cargo to retain the cargo in place.

Figure 2:
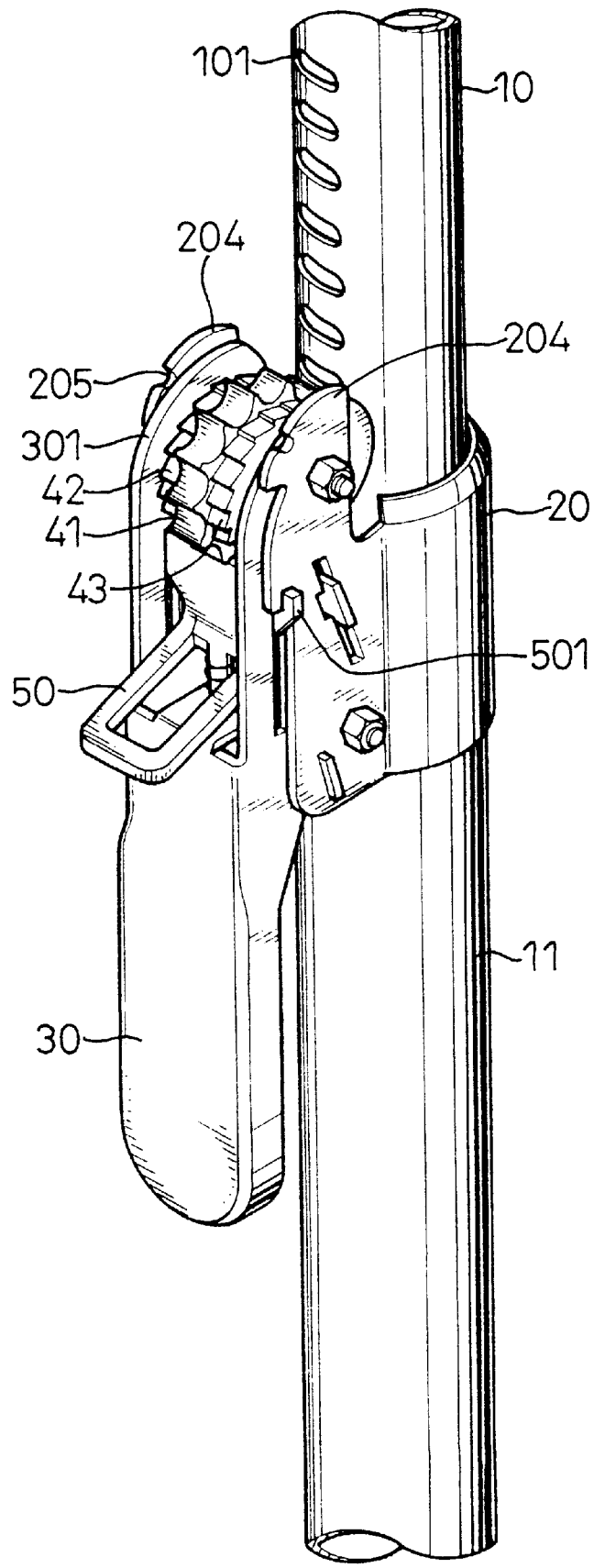
FIG. 2 is a perspective view of the main portion of the cargo positioning device.

Referring to FIGS. 1 and 2, a substantially C-shaped base 20 is fixed to the other end of the outer tube 11 and includes a pair of side walls 204 formed on two opposite end edges thereof and thus defining a space therebetween. It is appreciated that many suitable means can be used to fix the base 20 to the outer tube 11. The side walls 204 further include aligned inclined slots 201 defined in mediate sections thereof and aligned slots 202 defined in lower portions thereof. Each side wall 204 further includes an engaging member 203 and a notch 205 formed on an outer edge thereof. A bracket 23 is secured between the side walls 204 and includes a hole 232. In this embodiment, the bracket 23 includes two lateral wings 231 securely received in the slots 202 of the side walls 204, respectively. In addition, a catch member 21 is mounted between the side walls 204 and includes an upper end with two catches 211 and 212 and a lower end 214 that is slidably extended through the hole 232 of the bracket 23. The catch member 21 further includes a shoulder (including a right shoulder section and a left shoulder section, both designated by "213"), and a spring 22 is mounted around the second end of the catch member 21. More particularly, the spring 22 is mounted between the catch member 22 and the bracket 23 to bias the catches 211 and 212 of the catch member 22 to engage with two ratchet wheels 42 and 43, respectively, which will be described later. It is appreciated that two lateral edges (not labeled) of the catch member 21 are slidably guided in the inclined slots 201 of the side walls 204.

A handle 30 has a first end pivotally connected to the base 20. In this embodiment, the first end of the handle 30 includes two parallel lateral walls 306 each having a lug 301 formed on a distal end thereof. The lugs 301 have aligned holes (not labeled) extended by a bolt 206 (the right one in FIG. 1) that also extends through aligned holes (not labeled) in the side walls 204, and a nut 205 is provided to secure the bolt 206. The lateral walls 306 further include aligned slots 303, which will be described later.

A gear means 40 is rotatably mounted between the side walls 204 by, e.g., a bolt 206 (the left one in FIG. 1) extended through aligned holes (not labeled) and a hole (not labeled) in the gear means 40. The gear means 40 includes a gear 41 that includes a number of teeth for engaging with openings 101 defined in the inner tube 10 and thus moving the inner tube 10. It is appreciated that the inner tube 10 can be configured as a rack or the like to achieve the same function. At least one ratchet wheel is provided to a side of the gear 41. In this embodiment, two ratchet wheels 42 and 43 are respectively formed on two sides of the gear 41 to rotate therewith. Operation of the ratchet wheels 42 and 43 will be further described later.

A retaining member 50 includes a first end 501 slidably guided in the slots 303 of the handle 30. The retaining member 50 further includes a tongue 502 around which a spring 51 is mounted. The tongue 502 has a distal end slidably extended through a hole defined in an end wall 302 of the first end of the handle 30. The spring 51 is mounted between the end wall 302 and the retaining member 50 to bias the retaining member 50 away from a second operative end 307 (FIG. 1) of the handle 30. The retaining member 50 may further include a release member 503, which will be described later.

Figure 3:
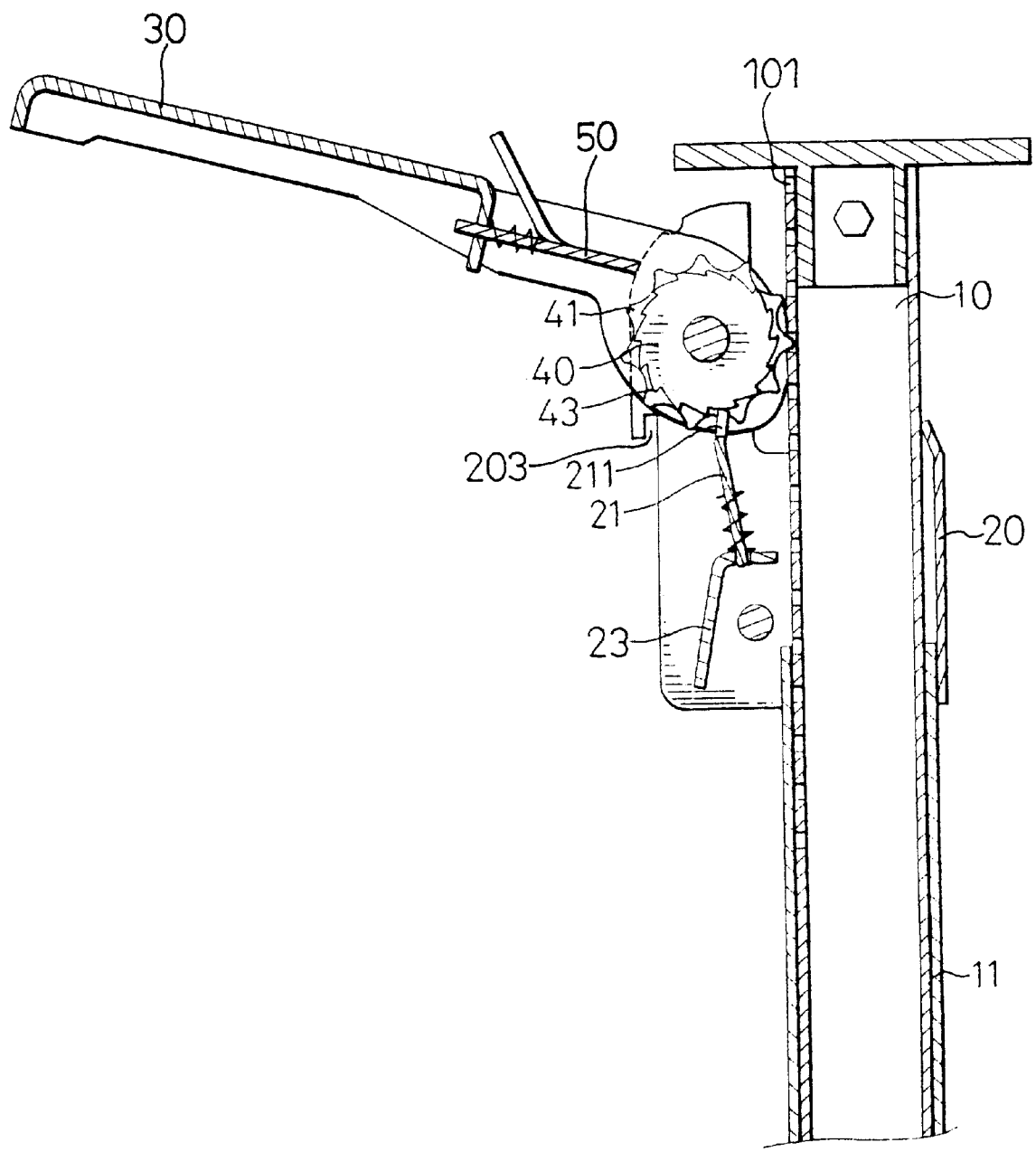
FIGS. 3 and 4 are sectional views illustrating outstretching operation of the cargo positioning device.
Figure 4:
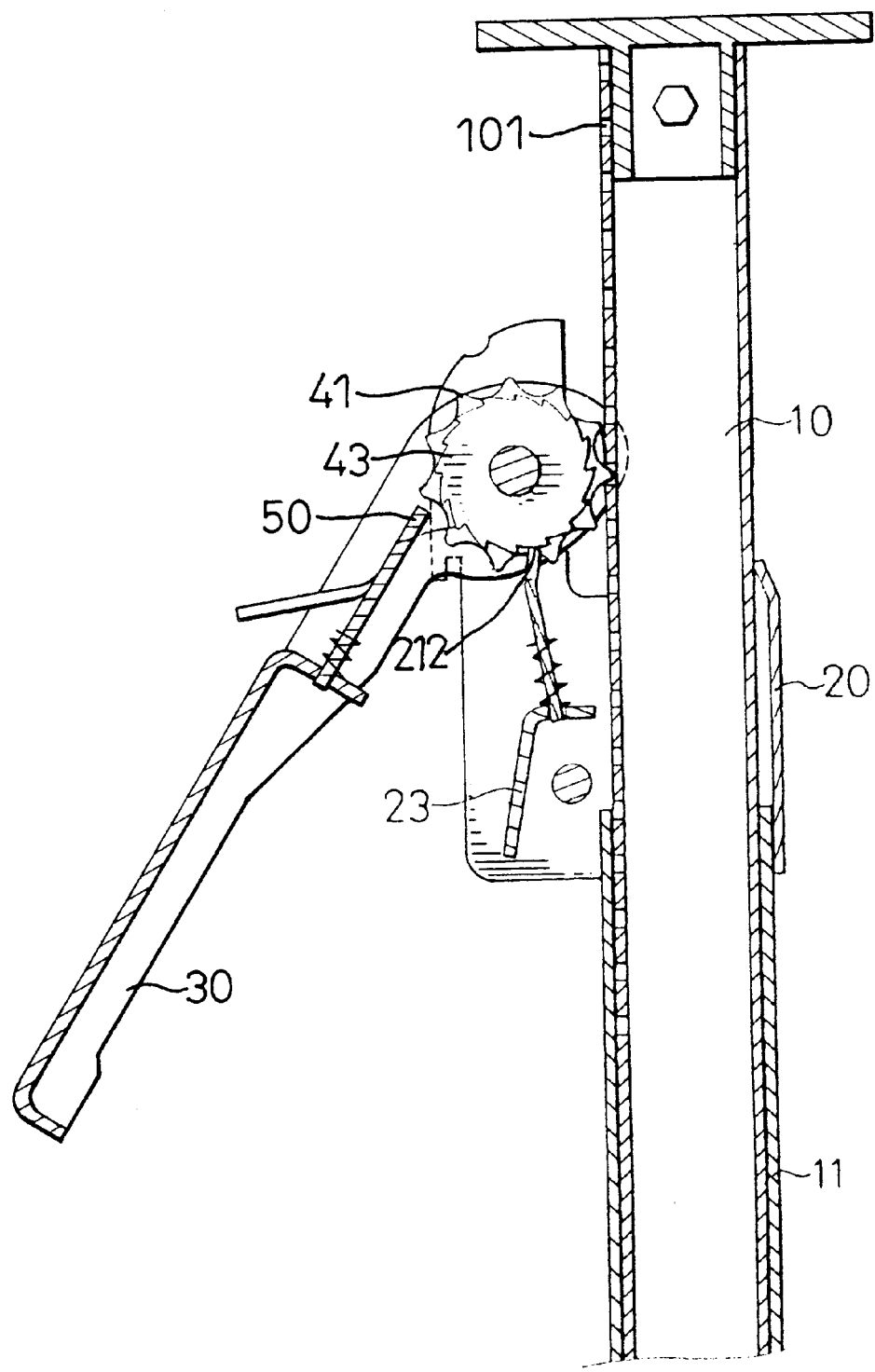

Referring to FIG. 3, the catches 211 and 212 of the catch member 21 engages with the ratchet wheels 42 and 43 such that the ratchet wheels 42 and 43 can only rotate in a first direction that allows outstretching of the inner tube 10. The first end 501 of the retaining member 50 is in a free position, i.e., not engaged with any element. For outstretching the inner tube 10, the user may pivot the handle 30 from a position shown in FIG. 3 to a position shown in FIG. 4, the inner tube 10 is outstretched by means of rotational movement of the gear 41 that engages with the openings 101 of the inner tube 10. Then, the handle 30 may be pivoted back to the position shown in FIG. 3 without causing any movement of the inner tube 10. This is because the ratchet wheels 42 and 43 cannot rotate in the reverse direction due to provision of the catches 211 and 212 of the catch member 21. Repeated reciprocating pivotal movements of the handle 30 may rapidly outstretch the inner tube 10 away from the outer tube 11 to a desired length and provide desired outward retaining forces to the inner walls of the cargo container to securely retain the cargo in place.

Figures 5, 6:
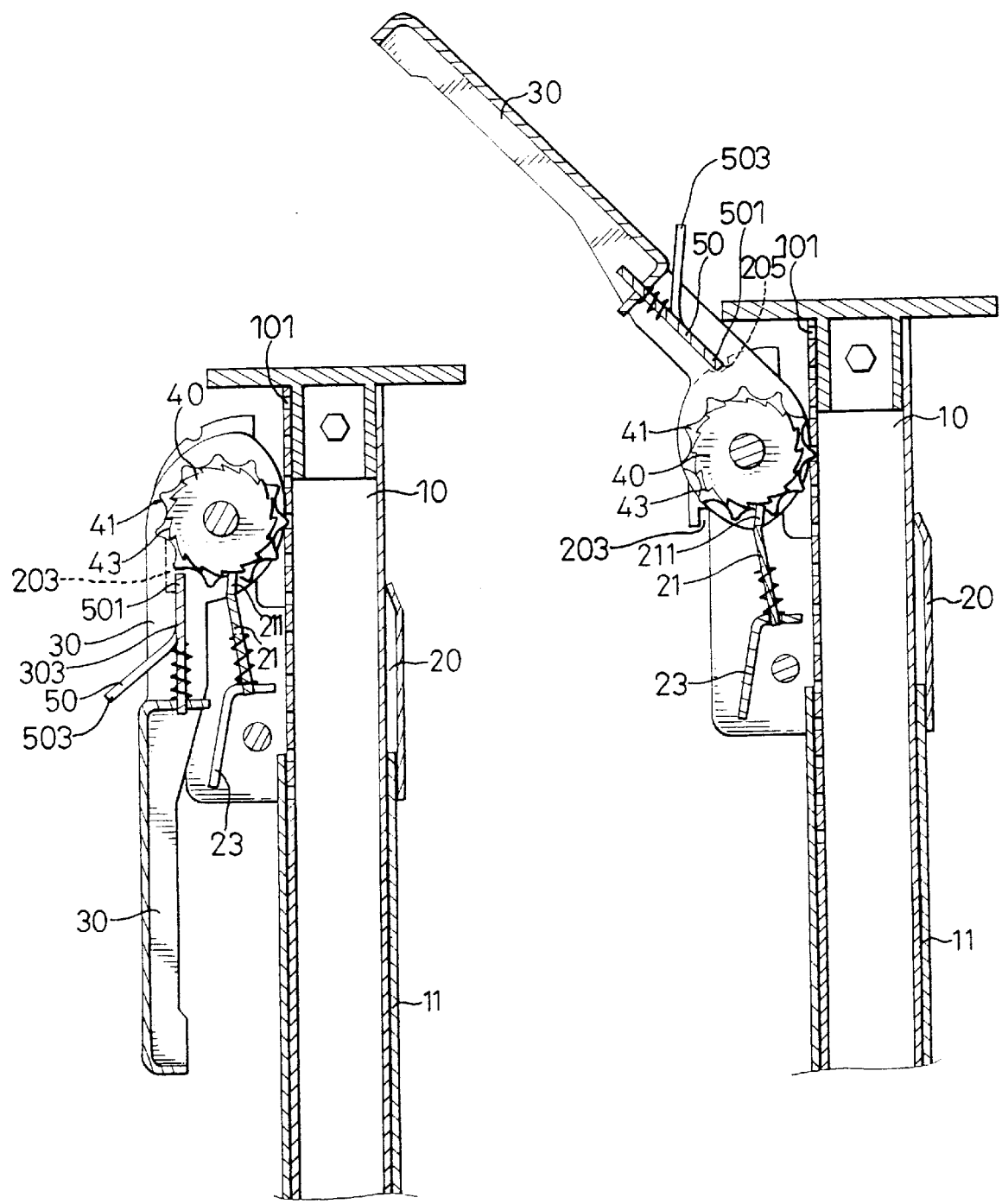
FIG. 5 is a sectional view of the cargo positioning device, in which the handle is in a position that makes a rack-like inner tube be in a locked status relative to an outer tube.
FIG. 6 is a sectional view of the cargo positioning device, in which the handle is in a position that allows the inner tube to be quickly retracted into the outer tube.

When the handle 30 is pivoted to a position (locked position or the first retaining position) shown in FIG. 5, the first end 501 of the retaining member 50 engages with the engaging members 203 (the first engaging members) on the side walls 204. As a result, the handle 30 is not pivotable. Namely, the gear 41 is not rotatable. In addition, the catches 211 and 212 of the catch 21 still engage with the ratchet wheels 42 and 43. This reliably retains the inner tube 10 in place relative to the outer tube 11. For unlocking, the user may simple press the release member 503 of the retaining member 50 to disengage the first end 501 thereof from the engaging members 203 on the side walls 204, thereby allowing pivotal movements of the handle 30.

When the handle 30 is pivoted to a position (quick retraction position or the second retaining position) shown in FIG. 6, the first end 501 of the retaining member 50 engages with the notches 205 (the second engaging members) on the side walls 204. Meanwhile, peripheral edges 304 of the lugs 301 of the first end of the handle 30 impinge the shoulder sections 213 of the catch member 21 and thus make the catches 211 and 212 disengage from the ratchet wheels 42 and 43. As a result, the gear 41 is freely rotatable in either direction, and the user may retract the inner tube 10 into the outer tube 11 in a rapid manner.

According to the above description, it is appreciated that the cargo positioning device may be securely retained in place after the inner tube is outstretched to the desired length, and the inner tube can be quickly retracted when not in use.

Although the invention has been explained in relation to its preferred embodiment, it is to be understood that many other possible modifications and variations can be made without departing from the spirit and scope of the invention as hereinafter claimed.

What is claimed is:

1. A cargo positioning device, comprising:
   a tube with a base fixed to an end thereof, the base including a first engaging member and a second engaging member provided thereon,
   a rack means having an end slidably received in the tube and movable in an outstretching direction and a retracting direction,
   a gear means including a gear rotatably supported by the base and meshed with the rack means, the gear including a ratchet wheel formed on a side thereof to rotate therewith,
   a handle including a first end pivotally connected to the base and a second operative end, the handle being movable between a first retaining position and a second retaining position,
   a catch member including an end releasably engaged with the ratchet wheel of the gear means, means for biasing the catch member to engage with the ratchet wheel, a retaining member mounted to the handle, wherein when the handle is at the first retaining position, the retaining member engages with the first engaging member on the base and thus prevents rotational movement of the handle such that the gear is not rotatable while the catch member engages with the ratchet wheel, and when the handle is at the second retaining position, the retaining member engages with the second engaging member on the base, and the first end of the handle causes the catch member to disengage from the ratchet wheel to thereby allowing free rotation of the gear such that the rack means is movable both in the outstretching direction and the retracting direction, and when the handle is reciprocatingly pivoted in a mediate area between the first retaining position and the second retaining position, the retaining member is in a free position, while the catch member engages with the ratchet wheel such that the gear means is rotatable in a direction that allows the rack means to move in the outstretching direction.

2. The cargo positioning device as claimed in claim 1, wherein the rack means is an inner tube having a plurality of holes defined in a periphery thereof for engaging with the gear.

3. The cargo positioning device as claimed in claim 1, wherein the base is C-shaped and includes two side walls formed on two opposite end edges thereof, said side walls having aligned slots defined therein, and wherein the catch member includes two lateral edges slidably received in the slots, respectively.

4. The cargo positioning device as claimed in claim 3, wherein the basing means includes a bracket secured between the side walls of the base and a spring attached between the bracket and the catch member to bias the catch member to engage with the ratchet wheel.

5. The cargo positioning device as claimed in claim 1, wherein the first end of the handle includes two parallel lateral walls having aligned slots defined therein, and the retaining member includes two lateral edges slidably received in the aligned slots, respectively, and further comprising a spring for biasing the retaining member away from the second operative end of the handle.

6. The cargo positioning device as claimed in claim 5, wherein the retaining member further includes a release member for manually pressing toward the spring for disengaging a first end of the retaining member from the first engaging member and the second engaging member of the base to thereby allow the handle to leave the first retaining position and the second retaining position.

* * * * *